United States Patent [19]
Suzuki

[11] Patent Number: 5,293,406
[45] Date of Patent: Mar. 8, 1994

[54] QUADRATURE AMPLITUDE MODULATOR WITH DISTORTION COMPENSATION

[75] Inventor: Hiroshi Suzuki, Kanagawa, Japan

[73] Assignees: Nippon Telegraph and Telephone Corporation; NTT Mobile Communications Network Inc., both of Tokyo, Japan

[21] Appl. No.: 849,595

[22] Filed: Mar. 11, 1992

[30] Foreign Application Priority Data

Mar. 11, 1991 [JP] Japan ................ 3-045250

[51] Int. Cl.$^5$ ........................... H04L 27/04
[52] U.S. Cl. ........................ 375/59; 375/60; 332/107
[58] Field of Search ............ 375/39, 59, 60, 57, 375/52, 53, 68; 332/103, 155, 107

[56] References Cited

U.S. PATENT DOCUMENTS

| | | | |
|---|---|---|---|
| 4,700,151 | 10/1987 | Nagata | 375/39 X |
| 5,093,637 | 3/1992 | Isota et al. | 375/60 X |
| 5,148,448 | 9/1992 | Karam et al. | 375/60 |

FOREIGN PATENT DOCUMENTS 0379114 7/1990 European Pat. Off. .

Primary Examiner—Curtis Kuntz
Assistant Examiner—Tesfaldet Bocure
Attorney, Agent, or Firm—Oblon, Spivak, McClelland, Maier & Neustadt

[57] ABSTRACT

A quadrature amplitude modulator capable of avoiding compensating the linear distortions completely and accurately by a simple configuration. The modulator includes a level signal generation unit for generating level signal for the modulated wave, and a parameter generation unit for determining appropriate values of linear transformation parameters of the linear transformation to be applied to the in-phase and quadrature amplitude input signals according to the level signal. In this modulator, the linear transformation parameters are determined sequentially in such an order that the linear transformation parameters for a DC off-set are determined first, then the linear transformation parameter for an amplitude balance is determined next while compensating distortion due to the DC off-set, and then the linear transformation parameter for an orthogonal phase relationship is determined while compensating distortions due to the DC off-set and the amplitude balance.

26 Claims, 10 Drawing Sheets

FIG.8

FOR $a_0$ & $b_0$

```
CONNECT SW22 & SW23 TO C TERMINALS,
& SET INITIAL VALUES
Ta=a₁ & Tb=b₁                                    101

DETERMINE VALUES a₀ & b₀ OF Ta & Tb
TO MINIMIZE z(t)                                 102
```

FOR $\alpha_0$

```
SET DETERMINED a₀ & b₀, SET
PROVISIONAL VALUES θ₀=0 & α₀=1,
& CONNECT SW22 & SW23 TO L TERMINALS              201

CONNECT SW20 & SW21 TO C TERMINALS,
INPUT T_I(t)=A & T_Q(t)=0 TO MEASURE z₁,
THEN INPUT T_I(t)=0 & T_Q(t)=A TO MEASURE z₂     202

CALCULATE α₀=(z₂/z₁)^(1/2)                       203
```

FOR $\theta_0$

```
SET DETERMINED a₀, b₀, α₀ &
T_Q(t)=A & T_I(t)=I₁                              301

DETERMINE VALUE I₀
OF T_I(t) TO MINIMIZE z(t)                        302

CALCULATE θ₀=arc sin (I₀/(α₀ A))                 303
```

```
SET DETERMINED a₀,b₀,α₀,θ₀ & CONNECT
SW20 & SW21 TO L TERMINALS                       400
```

QUADRATURE AMPLITUDE MODULATOR WITH DISTORTION COMPENSATION

BACKGROUND OF THE INVENTION

1. Field of the Invention

The present invention relates to a quadrature amplitude modulator with distortion compensation to be used in a communication such as a radio communication.

2. Description of the Background Art

In a communication such as a radio communication, a modulator is used for generating narrow band signals such as multi-level PSK (Phase Shift Keying) and QAM (Quadrature Amplitude Modulation).

In particular, in a case of digital modulation and demodulation schemes to be utilized in digital mobile communications, a modulator with higher accuracy is required compared with analog modulation and demodulation schemes because the digital schemes utilize waveform transmission instead of spectral transmission of the analogue schemes. For this reason, such a digital modulation and demodulation scheme uses a quadrature modulator to which an in-phase amplitude and a quadrature amplitude are applied as baseband signal inputs. However, a conventional quadrature modulator has the following problems.

(i) A carrier leak component is superposed onto the modulated wave even when the off-set levels of the baseband signal inputs are balanced, because it is difficult to balance the baseband signal inputs as the effective inputs inside the quadrature modulator.

(ii) An image component is superposed onto the modulated wave even when the amplitudes of the baseband signal inputs are balanced, because it is difficult to balance the baseband signal amplitudes as the effective inputs inside the quadrature modulator.

(iii) The quadrature modulator requires two input carrier signals with 0 phase and $\pi/2$ phase. It is, however, difficult to manufacture an accurate phase shifter for generating the $\pi/2$ carrier signal on an IC. When this orthogonal phase relationship between two carrier signals is not accurate, an image component is superposed onto the modulated wave.

(iv) When the quadrature modulator is implemented on an IC, its operational characteristics vary according to the variations of the power source voltage and the surrounding temperature.

In conventional quadrature modulators, these problems are solved by skillful adjustments of manufacturers. As for the variation due to aging, the necessary adjustment is provided by a regular maintenance service.

In order to adjust such a distortion compensation of the quadrature modulator automatically, two simple configurations have been proposed conventionally.

The first proposition is a configuration for compensating the distortion due to the inaccurate orthogonal phase relationships between the baseband signal inputs, disclosed in Japanese Patent Application Laid Open No. 62-13143, which is schematically shown in FIG. 1.

This quadrature modulator of FIG. 1 comprises: an in-phase amplitude input terminal 40 for receiving an in-phase amplitude input signal I(t) in baseband; a quadrature amplitude input terminal 41 for receiving a quadrature amplitude input signal Q(t) in baseband; a modulated wave output terminal 42 for outputting a modulated wave obtained from the baseband signal inputs; an oscillator 46; a $\pi/2$ phase shifter 45 for shifting the phase of the carrier generated by the oscillator 46; a first mixer 43 for mixing the in-phase amplitude input signal I(t) entered from the in-phase amplitude input terminal 40 with the phase shifted carrier generated by the $\pi/2$ phase shifter 45; a second mixer 44 for mixing the quadrature amplitude input signal Q(t) entered from the quadrature amplitude input terminal 41 with the carrier generated by the oscillator 46; a combiner 47 for combining the outputs of the first and second mixers 43 and 44; a signal identifier 48 for identifying signal constellation points constituted by the combinations of the in-phase amplitude input signal I(t) and the quadrature amplitude input signal Q(t); and an amplitude calculator 49 for measuring amplitudes of the signal constellation points identified by the signal identifier 48, obtaining a difference or a ratio of the measured amplitudes, and adjusting the $\pi/2$ phase shifter 45.

The measured amplitudes do not coincide with each other unless the $\pi/2$ phase shifter 45 is operating accurately, so that the compensation of the distortion due to the inaccurate orthogonal phase relationships between the carriers can be made automatically by adjusting the operation of the $\pi/2$ phase shifter 45 according to the amplitude difference obtained by the amplitude calculator 49.

However, this quadrature modulator configuration of FIG. 1 is associated with the following drawbacks.

(i) A fine adjustment of the phase shifter required in this configuration is difficult to realize in a practical phase shifter circuit.

(ii) A practical procedure for controlling the phase shifter is not disclosed.

(iii) An error due to the roll off shaping occurs in practice so that the practically achievable accuracy is insufficient.

(iv) The achievable accuracy becomes insufficient under the presence of the other distortions such as those due to a DC off-set and an amplitude imbalance.

The second proposition is a configuration for compensating the distortion due to the DC off-set, disclosed in Japanese Patent Application Laid Open No. 63-62439, which is schematically shown in FIG. 2. In FIG. 2, those elements which are equivalent to the corresponding elements appeared in FIG. 1 above are labelled by the same reference numerals.

In this quadrature modulator configuration of FIG. 2, the in-phase amplitude input signal I(t) applied to the in-phase amplitude input terminal 40 is mixed with a carrier generated by the oscillator 46 at the first mixer 43 and then the DC off-set in the output of the first mixer 43 is calculated by a DC off-set calculation unit 50, in which the output of the first mixer 43 is rectified and integrated for a negative modulation symbol and a positive modulation symbol separately according to a modulation symbol detected by a comparator 51 which compares the entered in-phase amplitude input signal I(t) with a ground level to determine the modulation symbol. The integrated values for the negative and positive modulation symbols are then added together to yield the total DC off-set which is negatively fed back to the in-phase amplitude input signal I(t) inputted into the first mixer 43 by a feed back loop 52 such that the DC off-set can be compensated. The DC off-set for the quadrature amplitude input signal Q(t) is compensated in the similar manner.

However, this quadrature modulator configuration of FIG. 2 is associated with the following drawbacks.

Namely, in this configuration of FIG. 2, the compensation of the distortion due to the DC off-set is carried out for the in-phase amplitude input signal I(t) and the quadrature amplitude input signal Q(t) separately, but this compensation of the distortion due to the DC off-set before the combiner 47 is actually insufficient because the further distortion is caused by the superposition of the local carrier which leaks in an actual high frequency circuit.

In addition, this configuration of FIG. 2 requires a considerably complicated circuit configuration.

In general, the modulated wave obtained by a quadrature modulator is impaired by a linear distortion as well as a nonlinear distortion. The nonlinear distortion is caused by a nonlinear response of diodes used in the mixers in the quadrature modulator, which can be suppressed relatively easily by reducing the input levels appropriately. On the other hand, the compensation of the linear distortion requires selection of well balanced parts or fine adjustment. This situation concerning the linear distortion will now be described in detail by using the quadrature modulator configuration of FIG. 1 described above as an example.

Namely, at the first and second mixers 43 and 44, the in-phase amplitude input signal I(t) and the quadrature amplitude input signal Q(t) are multiplied by a carrier wave $r_C(t)=\cos(\omega_C t)$ of an angular frequency $\omega_C$ generated by the oscillator 46 and a phase shifted carrier wave $r_S=-\sin(\omega_C t)$ obtained by the $\pi/2$ phase shifter 45, respectively, and then combined together at the combiner 47. However, a practical quadrature modulator is affected by the carrier leak due to the stray capacitance or the stray inductance as well as by the image generation due to the phase shift error by the $\pi/2$ phase shifter 45.

Consequently the actual modulator output y(t) is expressed by:

$$y(t)=y_1(t)+y_2(t)+y_3(t)+y_4(t) \tag{1}$$

where $y_1(t)$ is a response for a case the DC off-set $\delta_{C1}$ is added to the baseband signal at the first mixer 43, which is given by:

$$y_1(t)=[I(t)+\delta_{C1}]\cos(\omega_C t) \tag{2}$$

$y_2(t)$ is a response for a case in which the baseband signal with the DC off-set $\delta_{S1}$ added is multiplied with the quadrature carrier of a phase shift error $\theta$ as the gain of the second mixer 44 is $\alpha$ times that of the first mixer 43, which is given by:

$$y_2(t)=[-\alpha Q(t)+\delta_{S1}]\sin(\omega_C t+\theta) \tag{3}$$

$y_3(t)$ is a response for a case in which an amplitude and a phase of the carrier leak for the in-phase component are $\delta_{C2}$ and $\theta_1$, respectively, which is given by:

$$y_3(t)=\delta_{C2}\cos(\omega_C t+\theta_1) \tag{4}$$

and $y_4(t)$ is a response for a case in which an amplitude and a phase of the carrier leak for the in-phase component are $\delta_{S2}$ and $\theta_2$, respectively, which is given by:

$$y_4(t)=\delta_{S2}\sin(\omega_C t+\theta_2) \tag{5}$$

Thus, the modulator output y(t) can also be expressed as:

$$y(t)=c(t)\cos(\omega_C t)-d(t)\sin(\omega_C t) \tag{6}$$

where c(t) is an in-phase modulated signal which is given by:

$$c(t)=I(t)+\delta_C+\sin\theta[-\alpha Q(t)+\delta_{S1}] \tag{7}$$

and d(t) is a quadrature modulated signal which is given by:

$$d(t)=-\alpha Q(t)\cos\theta+\cos\theta\cdot\delta_{S1}+\delta_S \tag{8}$$

in which the off-sets $\delta_C$ and $\delta_S$ are given by:

$$\delta_C=\delta_{C2}\cos\theta_2+\delta_{S2}\sin\theta_{S2}\sin\theta_2 \tag{9}$$

$$\delta_S=-\delta_{C2}\sin\theta_1+\delta_{S2}\cos\theta_2 \tag{10}$$

However, the actual output of a conventional quadrature modulator such as those described above is not an ideal one in which the in-phase amplitude input signal I(t) and the in-phase modulated signal c(t) are equal and the quadrature amplitude input signal Q(t) and the quadrature modulated signal d(t) are equal.

Namely, as shown in a signal space diagram of FIG. 3, in an ideal case, the Lissajous' figure for the output of the quadrature modulator with the in-phase amplitude input signal I(t)=cos (x) and the quadrature amplitude input signal Q(t)=sin (x) for x=0 to $2\pi$ appears as a circle indicated by a solid line in FIG. 3, but the actual Lissajous' figure for the output of the actual quadrature modulator appears as an oblique oval with a center shifted away from an origin which is indicated by a broken line in FIG. 3 because of the linear distortions. In this Lissajous' figure for the actual output, the normal figure shown in FIG. 4A is superposed with the figure involving the DC off-set shown in FIG. 4B, the figure involving the amplitude imbalance shown in FIG. 4C, and the figure involving the inaccurate orthogonal phase relationship shown in FIG. 4D, where the deviation from the origin represents the carrier leak and the deviation from the circular shape represents the image. Thus, in the Lissajous' figure for the actual output shown by the broken line in FIG. 3, the contributions from the distortions shown in FIGS. 4B, 4C, and 4D are mixed up.

In order to compensate such a linear distortion, it is necessary to carry out the fine adjustment for minimizing the DC off-sets $\delta_{C1}$ and $\delta_{S1}$, the phase shift error $\theta$ of the quadrature carrier, and the carrier leaks $\delta_{C2}$ and $\delta_{S2}$, or the selection of the well balanced parts. However, such a fine adjustment or the selection of the well balanced parts requires a highly skilled operation, a time for making the adjustment, and an expensive measurement devices.

In order to solve the above described problems of the conventional quadrature modulator, there has been a proposition to use a linear transformation of the baseband signal inputs for the sake of the compensation of the linear distortion due to the DC off-set, as described in "Direct Conversion Transceiver Design for Compact Low-Cost portable Mobile Radio Terminals" by A. Bateman and D. M. Haines, 1989 Vehicular Technology Conference Proceeding, pp. 57-62, San Francisco, May 1989.

However, in the quadrature modulator described in this reference uses IQ detectors for extracting the in-phase component and the quadrature component of the output of the quadrature modulator in order to derive the linear parameters to be used in the linear transformation, so that it is necessary in this quadrature modulator to provide the IQ detectors having the higher accuracy than the quadrature modulator, but this in turn requires the fine adjustment of the DC off-set, amplitude balance, and orthogonal phase relationship for the IQ detectors themselves.

Furthermore, these conventionally proposed quadrature modulator configurations have a common problem that, since they are designed to deal with a particular type of the linear distortion alone, when the linear distortions due to the DC off-set and the amplitude imbalance are compensated, the linear distortion due to the inaccurate orthogonal phase relationship cannot be compensated, or visa versa.

SUMMARY OF THE INVENTION

It is therefore an object of the present invention to provide a quadrature amplitude modulator with distortion compensation capable of avoiding the deterioration of the modulated waves due to the linear distortions completely and accurately by a simple configuration.

According to one aspect of the present invention there is provided a quadrature amplitude modulator, comprising: linear transformation means for applying a linear transformation on in-phase and quadrature amplitude input signals I(t) and Q(t) to obtain in-phase and quadrature amplitude baseband signals a(t) and b(t); quadrature modulation means for obtaining a modulated wave from the in-phase and quadrature amplitude baseband signals a(t) and b(t) obtained by the linear transformation means; level signal generation means for generating level signal z(t) corresponding to the in-phase and quadrature amplitude input signals I(t) and Q(t) by removing carrier components from the modulated wave obtained by the quadrature modulation means; and parameter generation means for determining appropriate values of linear transformation parameters of the linear transformation applied by the linear transformation means according to the level signal z(t) generated by the level signal generation means.

According to another aspect of the present invention there is provided a quadrature amplitude modulator, comprising: linear transformation means for applying a linear transformation on in-phase and quadrature amplitude input signals to obtain in-phase and quadrature amplitude baseband signals; quadrature modulation means for obtaining a modulated wave from the in-phase and quadrature amplitude baseband signals obtained by the linear transformation means; and parameter generation means for determining appropriate values of linear transformation parameters of the linear transformation applied by the linear transformation means sequentially in such an order that the linear transformation parameters for a DC off-set are determined first, then the linear transformation parameter for an amplitude balance is determined next while compensating distortion due to the DC off-set, and then the linear transformation parameter for an orthogonal phase relationship is determined while compensating distortions due to the DC off-set and the amplitude balance.

Other features and advantages of the present invention will become apparent from the following description taken in conjunction with the accompanying drawings.

BRIEF DESCRIPTION OF THE DRAWINGS

FIG. 8 is a flow chart of a procedure for determining the linear transformation parameters in the quadrature amplitude modulator of FIG. 6.

DETAILED DESCRIPTION OF THE PREFERRED EMBODIMENTS

Figure 5:
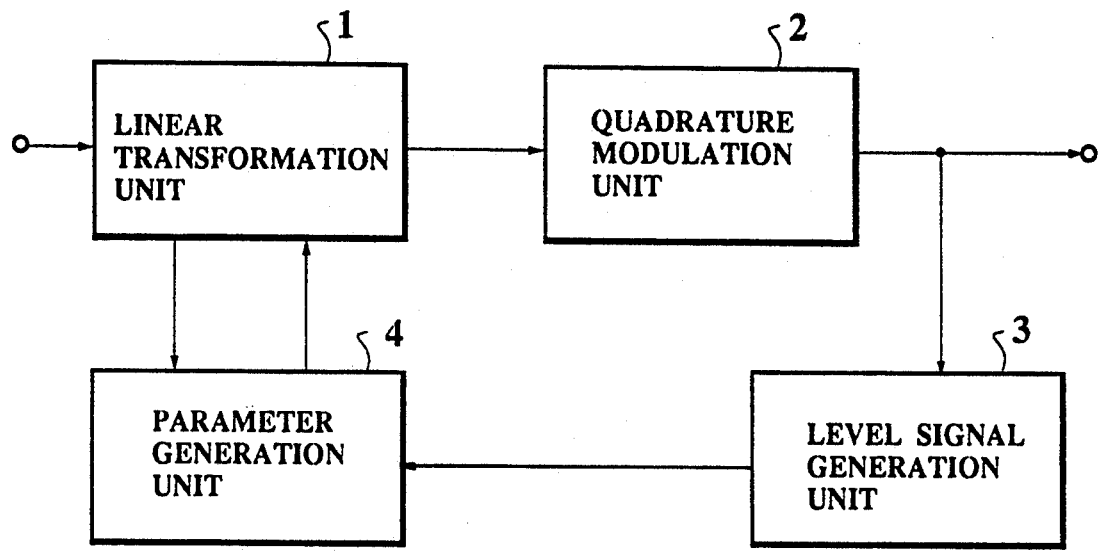
FIG. 5 is a schematic block diagram of a general configuration of a quadrature amplitude modulator with distortion compensation according to the present invention.

Referring now to FIG. 5, a general configuration of a quadrature amplitude modulator with distortion compensation according to the present invention will be described in detail.

As shown in FIG. 5, according to the present invention, the quadrature amplitude modulator generally comprises: a linear transformation unit 1 for applying a linear transformation using the linear transformation parameters to the in-phase amplitude input signal and the quadrature amplitude input signal to obtain the baseband signals; a quadrature modulation unit 2 for obtaining the modulated wave from the baseband signals outputted from the linear transformation unit 1; a level signal generation unit 3 for obtaining level signals from the modulated wave outputted from the quadrature modulation unit 2 by removing the carrier component; and a parameter generation unit 3 for obtaining the linear transformation parameters to be used in the linear transformation at the linear transformation unit 1 from the level signals obtained by the level signal generation unit 3.

In this configuration of FIG. 5, the presence of the linear components such as the carrier leak and the image in the modulated wave is detected as the level variation by the level signal generation unit 3. Then, the parameter generation unit 4 obtains the appropriate linear parameters to suppress the distortions due to the detected linear components according to the level variation, such that the baseband signals obtained at the linear transformation unit 1 and to be inputted into the quadrature modulation unit 2 are free of the linear distortions.

In the first embodiment to be described below, the parameter generation unit 4 obtains the appropriate linear transformation parameters from the level signals by using the known test signals.

In the second embodiment to be described below, the parameter generation unit 4 obtains the appropriate linear transformation parameters from the level signals by monitoring the state of the entering in-phase and quadrature amplitude input signals.

Furthermore, the actual linear distortions due to different sources are mixed up, so that in the quadrature amplitude modulator of the present invention the calculation of the linear transformation parameters and the compensation of the distortions are systematically carried out in an order of the distortion due to the DC off-set, the distortion due to the amplitude imbalance, and the distortion due to the inaccurate orthogonal phase relationship.

Figure 6:
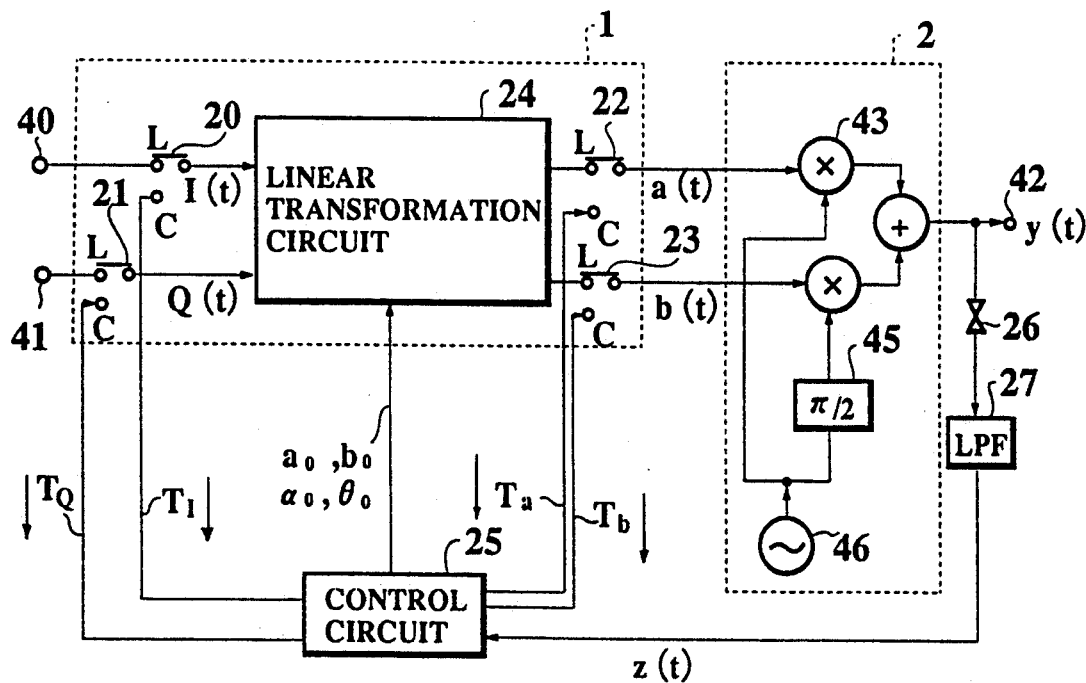
FIG. 6 is a detail block diagram of the first embodiment of a quadrature amplitude modulator with distortion compensation according to the present invention.

Referring now to FIG. 6, the first embodiment of the quadrature amplitude modulator with distortion compensation according to the present invention will be described in detail.

This quadrature modulator of FIG. 6 comprises: an in-phase amplitude input terminal 40 for receiving an in-phase amplitude input signal I(t); a quadrature amplitude input terminal 41 for receiving a quadrature amplitude input signal Q(t); a linear transformation unit 1 for applying a linear transformion to transform the received in-phase and quadrature amplitude input signals I(t) and Q(t) into in-phase and quadrature baseband signals a(t) and b(t); a quadrature modulation unit 2 for obtaining a modulated wave y(t) from the in-phase and quadrature baseband signals a(t) and b(t) obtained by the linear transformation unit 1; a modulated wave output terminal 42 for outputting the modulated wave y(t) obtained by the quadrature modulation unit 2; a detector 26 for detecting the modulated wave y(t) outputted from the quadrature modulation unit 2; a low pass filter 27 for removing the carrier component from the modulated wave y(t) detected by the detector 26 to obtain a corresponding level signal z(t); a control circuit 25 for determining appropriate linear transformation parameters to be used by the linear transformation unit 1 from the level signal z(t) obtained by the low pass filter 27.

The linear transformation unit 1 further comprises: a linear transformation circuit 24 for applying the linear transformation using the appropriate linear transformation parameters determined by the control circuit 25; a first switch 20 for selectively connecting the control circuit 25 to the in-phase amplitude signal input of the linear transformation circuit 24; a second switch 21 for selectively connecting the control circuit 25 to the quadrature amplitude signal input of the linear transformation circuit 24; a third switch 22 for selectively connecting the control circuit 25 to the in-phase baseband signal output of the linear transformation circuit 24; and a fourth switch 23 for selectively connecting the control circuit 25 to the quadrature baseband signal output of the linear transformation circuit 24.

The quadrature modulation unit 2 further comprises: an oscillator 46; a $\pi/2$ phase shifter 45 for shifting the phase of the carrier generated by the oscillator 46; a first mixer 43 for mixing the in-phase baseband signal a(t) entered from the in-phase baseband signal output of the linear transformation unit 1 with the carrier generated by the oscillator 46; a second mixer 44 for mixing the quadrature baseband signal b(t) entered from the quadrature baseband signal output of the linear transformation unit 1 with the phase shifted waves generated by the $\pi/2$ phase shifter 45; and a combiner 47 for combining the outputs of the first and second mixers 43 and 44.

In this configuration of FIG. 6, the detector 26 is required to have a square law detection characteristic. This square law detection characteristic may be realized by reducing the input level in an ordinary detector. Alternatively, in order to ensure the square law detection characteristic, a double balanced mixer with the modulated wave entered into its RF and LO terminals and the output taken out from its baseband terminal may be used.

Figure 1:
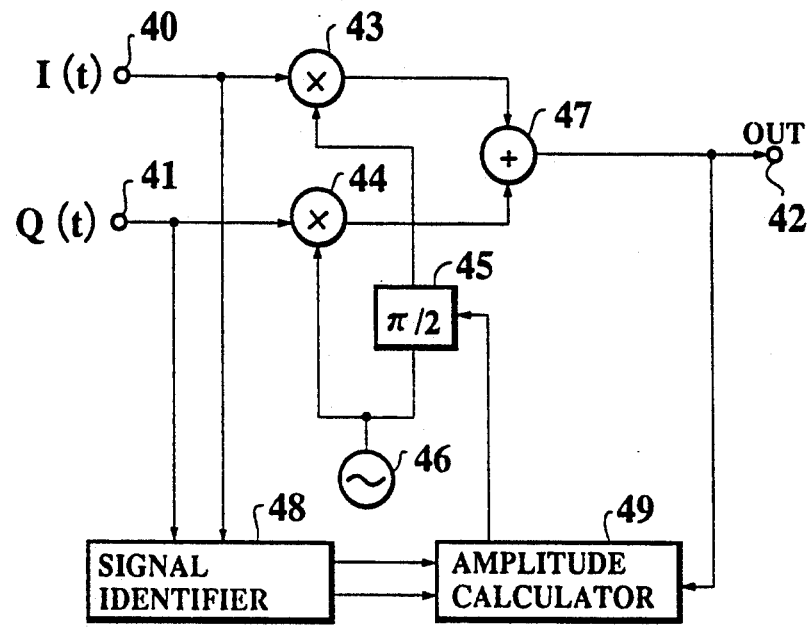
FIG. 1 is a schematic block diagram of one example of a conventional quadrature modulator with a compensation of a distortion due to an inaccurate orthogonal phase relationship.
Figure 2:
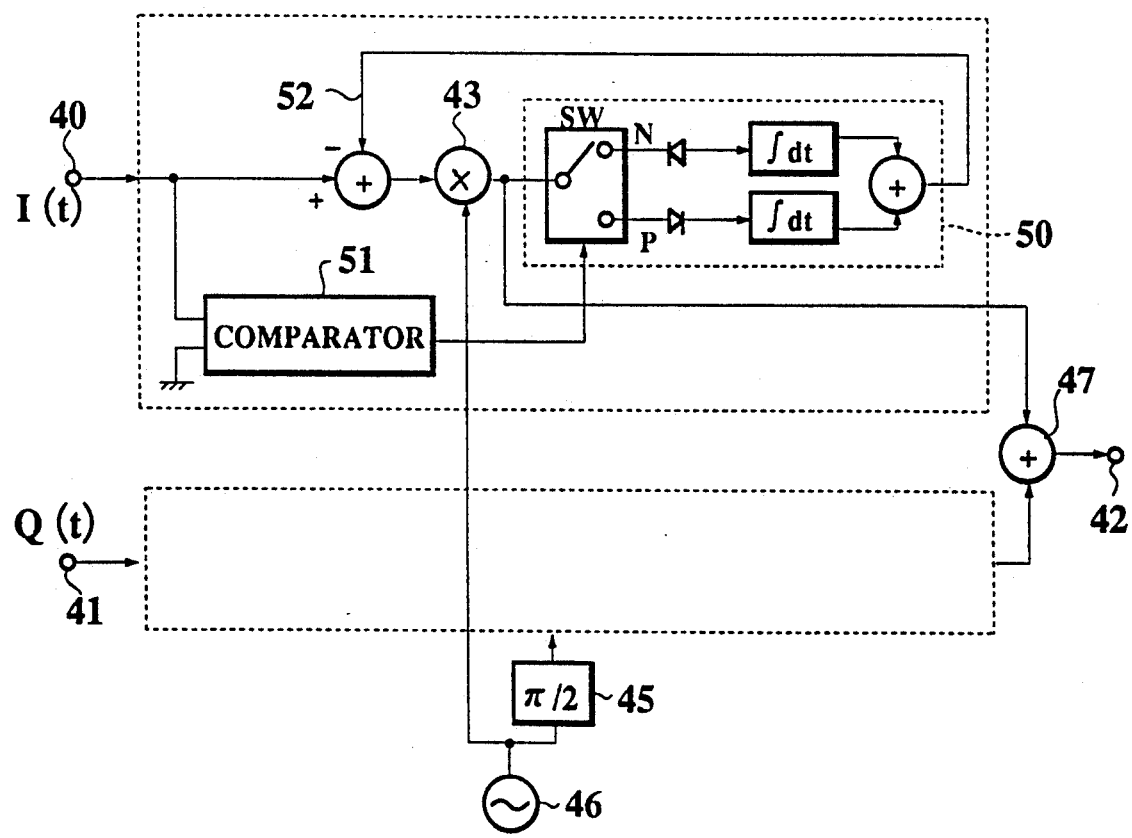
FIG. 2 is a schematic block diagram of another example of a conventional quadrature modulator with a compensation of a distortion due to a DC off-set.
Figure 3:
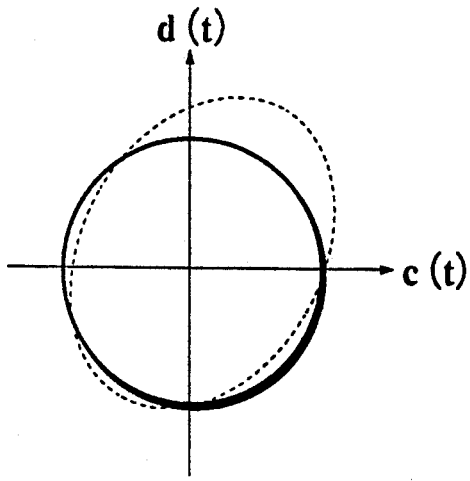
FIG. 3 is a signal space diagram for showing the Lissajous' figures for an ideal and a non-ideal quadrature modulator outputs.
Figure 4A:
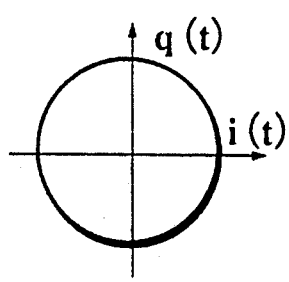
FIGS. 4A, 4B, 4C, and 4D are signal space diagrams for showing the Lissajous' figures for a normal and linearly distorted quadrature modulator outputs.
Figure 4B:
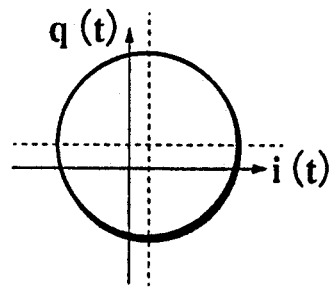
Figure 4C:
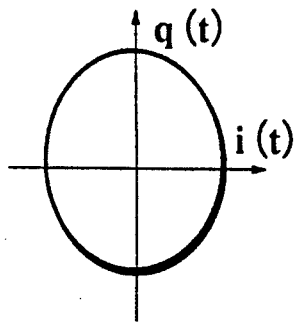
Figure 4D:
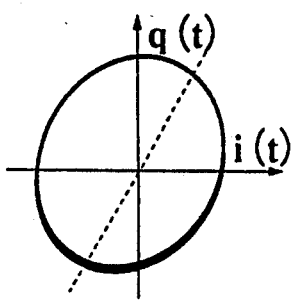

Moreover, it is preferable for the control circuit 25 which functions as the parameter generation unit 4 of FIG. 1 to be capable of digital signal processing, and accordingly the output of the low pass filter 27 should preferably be A/D converted.

In this quadrature amplitude modulator of FIG. 6, all the switches 20, 21, 22, and 23 are initially connected to L terminals such that the control circuit 25 is disconnected at the switches. Thus, the in-phase amplitude input signal I(t) and the quadrature amplitude input signal Q(t) are entered into the linear transformation circuit 24 to obtain the in-phase amplitude baseband signal a(t) and the quadrature amplitude baseband signal b(t). These baseband signals a(t) and b(t) are then entered into the quadrature modulation unit 2 to obtain the modulated wave y(t) which can be expressed by the equations (6) to (10) described above.

The obtained modulated wave y(t) is then detected by the detector 26 and the carrier component is removed from the modulated wave y(t) by the low pass filter 27 to obtain the level signal z(t).

The obtained level signal z(t) is then entered into the control circuit 25 to determine the appropriate linear transformation parameters to be set to the linear transformation circuit 24.

This determination of the appropriate linear transformation parameters at the control circuit 25 is carried out in detail as follows.

First, in an ideal case, the in-phase amplitude c(t) and the quadrature amplitude d(t) of the modulated wave y(t) outputted from the quadrature modulation unit 2 should be equal to the in-phase amplitude input signal I(t) and the quadrature amplitude input signal Q(t), respectively, so that the following equations (11) and (12) should hold.

$$c(t) = I(t) \qquad (11)$$

$$d(t) = Q(t) \quad (12)$$

Then, by solving these equations (11) and (12) and the above described equations (7) and (8) together, it follows that the in-phase amplitude baseband signal a(t) and the quadrature amplitude baseband signal b(t) can be expressed as:

$$a(t) = I(t) + \tan\theta \cdot Q(t) + a \quad (13)$$

$$b(t) = (1/\alpha \cos\theta)Q(t) + b \quad (14)$$

where $$a = -\delta_C + \tan\theta(\delta_S + \delta_{S1}\cos\theta) - \sin\theta \cdot \delta_{S1} \quad (15)$$

$$b = (\cos\theta \cdot \delta_{S1} + \delta_S)/\alpha \cos\theta \quad (16)$$

In the above equations (13) to (16), the parameters $\alpha$, $\theta$, a, and b are unknown a priori and their values must be determined. When the determined values of these parameters are assumed to be $\alpha_0$, $\theta_0$, $a_0$, and $b_0$, respectively, the linear transformation to be carried out at the linear transformation circuit 24 can be expressed as:

$$a(t) = I(t) + \tan\theta_0 \cdot Q(t) + a_0 \quad (17)$$

$$b(t) = (1/\alpha_0 \cos\theta_0)Q(t) + b_0 \quad (18)$$

Figure 7:
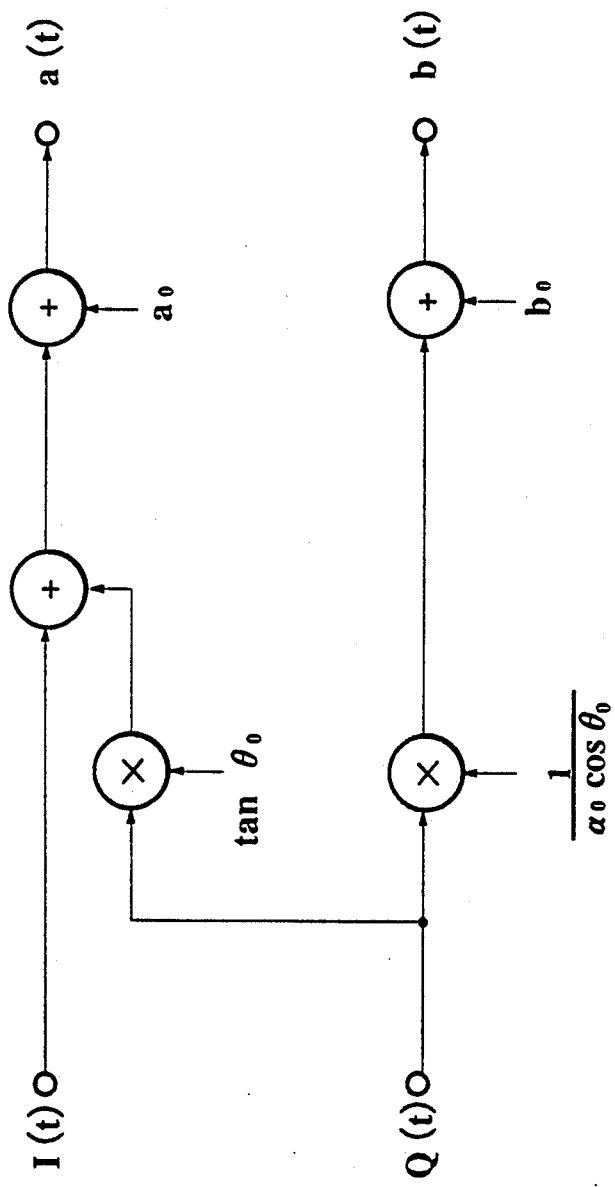
FIG. 7 is a diagram for the linear transformation to be carried out in a linear transformation unit of the quadrature amplitude modulator of FIG. 6.

Thus, the linear transformation carried out at the linear transformation circuit 24 is such that the in-phase baseband input a(t) of the quadrature modulation unit 2 is obtained as the baseband signal in which the in-phase amplitude input signal I(t) is added with the quadrature amplitude input signal Q(t) multiplied by $\tan\theta_0$ and the parameter $a_0$, while the quadrature baseband input b(t) of the quadrature modulation unit 2 is obtained as the baseband signal in which the quadrature amplitude input signal Q(t) multiplied by an inverse of $\alpha_0 \cos\theta_0$ is added with the parameter $b_0$, as indicated in a diagram of FIG. 7.

On the other hand, the level signal z(t) of the modulated wave y(t) obtained by the detector 26 and the low pass filter 27 can be expressed as:

$$z(t) = c^2(t) + d^2(t) \quad (19)$$

Now, the control circuit 25 determines the appropriate values of the above described linear transformation parameters a and b by first inputting the known test baseband signals Ta and Tb into the quadrature modulation unit 2 in places of the in-phase amplitude baseband signal a(t) and the quadrature amplitude baseband signal b(t) by connecting the third and fourth switches 22 and 23 to C terminals, and then monitoring the level signal z(t) resulting from the input of the known test baseband signals Ta and Tb, as follows.

First, the in-phase amplitude c(t) and the quadrature amplitude d(t) of the modulated wave y(t) outputted from the quadrature modulation unit 2 are expressed by the equations (7) and (8) described above, so that by substituting these equations (7) and (8) into the above equation (19) for the level signal z(t) and then setting the partial derivatives of the level signal z(t) with respect to the in-phase and quadrature amplitude baseband signals a(t) and b(t) to be equal to zero, the following simultaneous equations can be obtained.

$$\frac{\partial z(t)}{\partial a(t)} = 2[a(t) + \delta_C + \sin\theta(-\alpha b + \delta_{S1})] = 0 \quad (20)$$

$$\frac{\partial z(t)}{\partial b(t)} = 2[a(t) + \delta_C + \sin\theta(-\alpha b + \delta_{S1})]\alpha\sin\theta + \quad (21)$$
$$2[-\alpha b(t)\cos\theta + \cos\theta \cdot \delta_{S1} + \delta_S](-\alpha\cos\theta)$$
$$= 0$$

The solutions of these simultaneous equations (20) and (21) for a(t) and b(t) coincide with the right hand sides of the above described equations (15) and (16) for the ideal case.

This implies that the values of the inputs a(t) and b(t) which minimize the level signal z(t) are the desired linear transformation parameters $a_0$ and $b_0$.

Thus, the control circuit 25 can determine the appropriate values of the linear transformation parameters a and b by gradually varying the value of the test baseband signals Ta and Tb to be inputted into the quadrature modulation unit 2, and finding the values of the test baseband signals Ta and Tb which minimize the resulting level signal z(t).

Next, the control circuit 25 sets the determined appropriate values $a_0$ and $b_0$ of the linear parameters a and b along with provisional setting values $\theta_0 = 0$ for the phase shift error parameter $\theta$ and $\alpha_0 = 1$ for the amplitude ratio parameter $\alpha$ to the linear transformation circuit 24, and the third and fourth switches 22 and 23 are switched back to the L terminals. Then, the linear transformation circuit 24 carried out the linear transformation of the in-phase and quadrature amplitude input signals I(t) and Q(t) to obtain the in-phase and quadrature amplitude baseband signals a(t) and b(t) according to the above described values of the linear transformation parameters set by the control circuit 25. Then, the quadrature modulation unit 2 obtains the modulated wave y(t) from these in-phase and quadrature amplitude baseband signals a(t) and b(t), whose in-phase and quadrature amplitudes c(t) and d(t) can be expressed as:

$$c(t) = I(t) - \alpha \sin\theta Q(t) \quad (22)$$

$$d(t) = -\alpha \cos\theta Q(t) \quad (23)$$

Thus, the control circuit 25 determines the appropriate values of the above described linear transformation parameters $\alpha$ and $\theta$ by first inputting the known test input signals $T_I$ and $T_Q$ into the linear transformation circuit 24 in places of the in-phase amplitude input signal I(t) and the quadrature amplitude input signal Q(t) by connecting the first and second switches 20 and 21 to C terminals, and then monitoring the level signal z(t) resulting from the input of the known test input signals $T_I$ and $T_Q$, as follows.

First, the control circuits 25 inputs the test input signals $T_I = A$ and $T_Q = 0$ where A is a known value, such that the level signal $z_1(t) = A^2$ is outputted from the quadrature modulation unit 2 in response to the input of these test input signals $T_I$ and $T_Q$. Then, the control circuit 25 inputs another test input signals $T_I = 0$ and $T_Q = A$ where A is a known value, such that the level signal $z_2(t) = \alpha^2 A^2$ is outputted from the quadrature modulation unit 2 in response to the input of these test input signals $T_I$ and $T_Q$. Finally, the control circuit 25 determines the appropriate value of the linear transformation parameter $\alpha$ as:

$$\alpha_0 = (z_2/z_1)^{\frac{1}{2}} \quad (24)$$

In this procedure for determining the appropriate value of the linear transformation parameter $\alpha$, it is assumed that the level signal z(t) obtained by the detector 26 and the low pass filter 27 is accurately proportional to the actual level of the modulated wave y(t). However, the actual level signal output has a bias component superposed, so that it is necessary to calibrate the detector 26 and the low pass filter 27 such that the level signal z(t) outputted in response to the absence of the modulated wave y(t) is exactly nullified.

Next, when the expressions of the equations (22) and (23) described above are assumed to be holding with the quadrature amplitude input signal Q(t)=A, by setting the partial derivatives of the level signal z(t) with respect to the in-phase amplitude input signal I(t) to be equal to zero, the following equation can be obtained.

$$\frac{\partial z(t)}{\partial I(t)} = 2[I(t) - \alpha A \sin\theta] = 0 \quad (25)$$

Then, putting the solution of this equation (25) for I(t) to be $I_0$, it follows that the linear transformation parameter $\theta$ can be expressed as:

$$\theta = \arcsin(I_0/\alpha A) \quad (26)$$

This implies that the desired value of the linear transformation parameter $\theta_0$ can be obtained from the value $I_0$ of the in-phase amplitude input signal I(t) which minimizes the level signal z(t), and the value $\alpha_0$ of the linear transformation parameter $\alpha$ determined by the equation (24) above.

Thus, the control circuit 25 can determine the appropriate value of the linear transformation parameter $\theta$ by gradually varying the value of the test input signals $T_I$ to be inputted into the quadrature modulation unit 2, and finding the value $I_0$ of the test input signals $T_I$ which minimizes the resulting level signal z(t), and then calculating the appropriate value $\theta_0$ by substituting the value $I_0$ and the appropriate value $\alpha_0$ determined before into the equation (26) described above.

In summary, the determination of the appropriate linear transformation parameters at the control circuit 25 can be carried out according to the flow chart of FIG. 8, as follows.

First, at the step 101, the third and fourth switches 22 and 23 are switched to the C terminals, and the initial values Ta(t=0)=$a_1$ and Tb(t=0)=$b_1$ of the test baseband signals Ta and Tb are entered from the control circuit 25 to the quadrature modulation unit 2.

Then, at the step 102, the values of the test baseband signals Ta(t) and Tb(t) which minimize the resulting level signal z(t) are determined by gradually varying the values of the test baseband signals Ta(t) and Tb(t) supplied from the control circuit 25 to the quadrature modulation unit 2, which are then taken as the appropriate values of the linear transformation parameters a and b.

Next, at the step 201, the appropriate values $a_0$ and $b_0$ of the linear transformation parameters a and b are set to the linear transformation circuit 24 by the control circuit 25, along with the provisional values $\theta_0=0$ and $\alpha_0=1$, and the third and fourth switches 22 and 23 are switched back to the L terminals.

Then, at the step 202, the first and second switches 20 and 21 are switched to the C terminals, and the control circuits 25 first inputs the test input signals $T_I=A$ and $T_Q=0$ where A is a known value to the linear transformation circuit 24, such that the level signal $z_1(t)=A^2$ is outputted from the quadrature modulation unit 2 in response. Then, the control circuit 25 inputs another test input signals $T_I=0$ and $T_Q=A$ where A is a known value to the linear transformation circuit 24, such that the level signal $z_2(t)=\alpha^2 A^2$ is outputted from the quadrature modulation unit 2 in response.

Then, at the step 203, the control circuit 25 determines the appropriate value $\alpha_0$ of the linear transformation parameter $\alpha$ by calculating $\alpha_0=(z_2/z_1)^{\frac{1}{2}}$ according to the equation (24).

Next, at the step 301, the appropriate values $a_0$, $b_0$, and $\alpha_0$ of the linear transformation parameters a, b, and $\alpha$ are set to the linear transformation circuit 24 by the control circuit 25, and the initial values $T_I=I_1$ and $T_Q=A$ where A is a known value for the test input signals $T_I$ and $T_Q$ are entered from the control circuit 25 to the quadrature modulation unit 2.

Then, at the step 302, the value $I_0$ of the test input signal $T_I$ which minimizes the resulting level signal z(t) is determined by gradually varying the values of the test input signal $T_I(t)$ supplied from the control circuit 25 to the quadrature modulation unit 2.

Then, at the step 303, the control circuit 25 determines the appropriate value $\theta_0$ of the linear transformation parameter $\theta$ by calculating $\theta_0=\arcsin(I_0/a_0 A)$ according to the equation (26).

Finally, at the step 400, the appropriate values $a_0$, $b_0$, $\alpha_0$, and $\theta_0$ for the linear transformation parameters a, b, $\alpha$, and $\theta$ are set to the linear transformation circuit 24 by the control circuit 25, and the first and second switches 20 and 21 are switched back to the L terminals.

Thus, according to this procedure for the determination of the linear transformation parameters summarized in FIG. 8, the control circuit 25 can determine the appropriate values of the linear transformation parameters for compensating the linear distortions from the level signals obtained by the detector 26 and the low pass filter 27 alone.

In the procedure of FIG. 8, at the steps 102 and the step 302, it is necessary to determine the values of the test baseband and input signals Ta, Tb, and $T_I$ which minimize the resulting level signal z(t). These steps can be realized easily by a perturbation method which utilizes the fact that the gradient of the level signal z(t) with respect to the input to be determined changes the sign at a point at which the level signal z(t) becomes minimum. Such a perturbation procedure can be carried out according to the flow chart of FIG. 9, as follows. In this flow chart of FIG. 9, the perturbation method for determining the value of the input Ta with the value of Tb fixed is shown as an example.

Namely, first at the step 501, the initial value for the input Ta is set to $a_1$.

Then, at the step 502, the following settings are made.

$$Ta(t) = e \cdot \sin(t) + a_n \quad (27)$$

$$Tb(t) = b \quad (28)$$

where $0 < e << 1$ is a perturbation amplitude, b is a constant, and $a_n$ is a value of Ta(t) at the n-th stage of the perturbation.

Then, at the step 503, $a_n$ of the equation (27) is updated according to the following equation (29).

$$a_n = a_{n-1} - \int_{2(n-1)\pi}^{2n\pi} z(t)\sin(t)dt \tag{29}$$

Then, at the step 504, the above described steps 502 and 503 are repeated until n=N, where N is a maximum number of perturbations.

Figure 9:
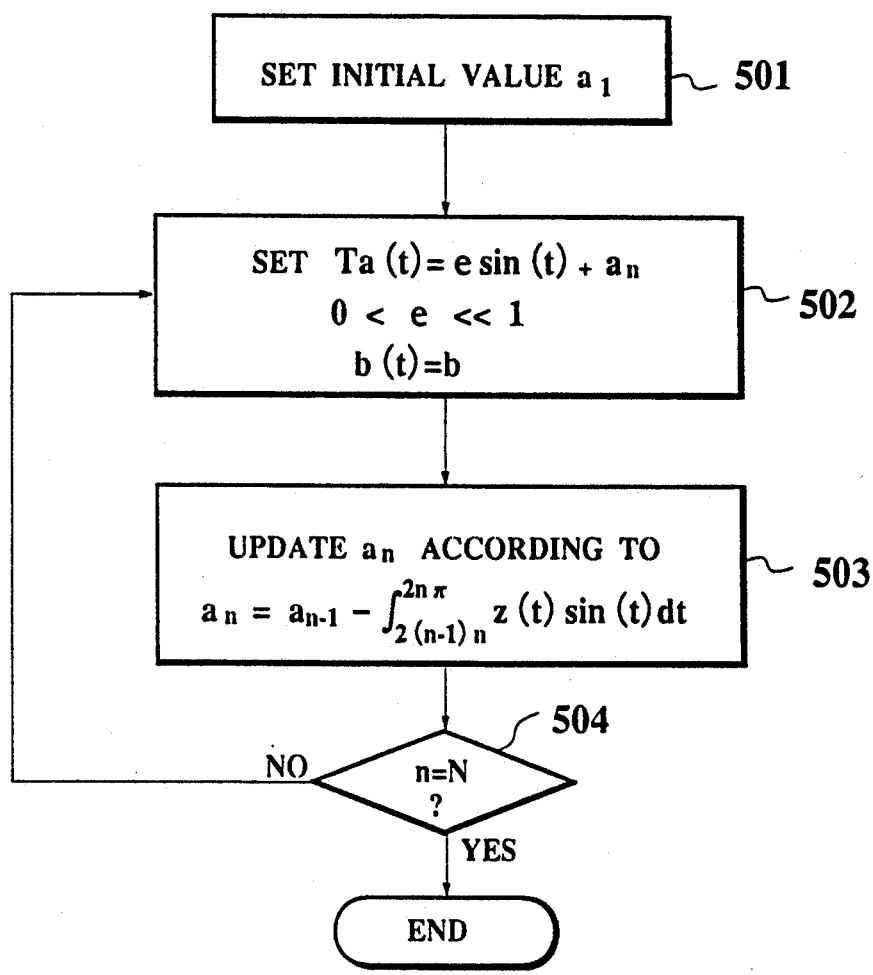
FIG. 9 is a flow chart of a perturbation method to be utilized in the procedure of FIG. 8.
Figure 10:
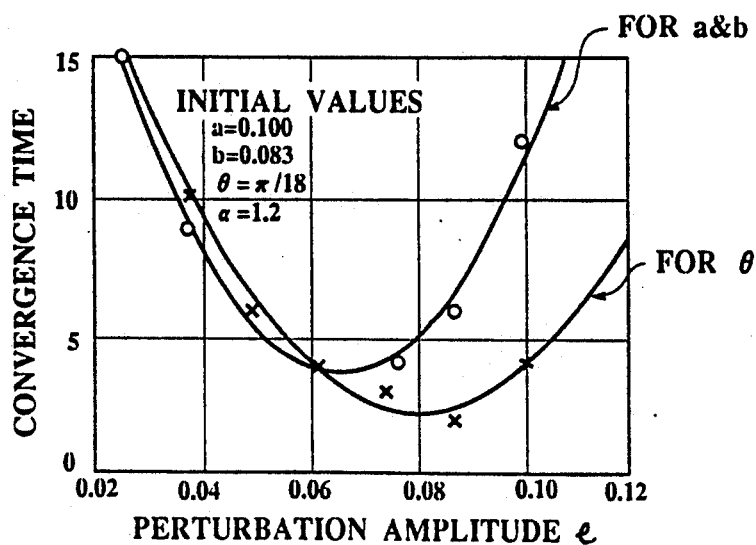
FIG. 10 is a graph showing a relationship between the convergence time and the perturbation amplitude in the perturbation method of FIG. 9.

In this perturbation method of FIG. 9, the perturbation is externally provided, so that the time taken by the method to reach the convergence to the appropriate value depends on the magnitude of the perturbation amplitude, as shown in FIG. 10, and consequently, the use of the suitable perturbation amplitude to reach the convergence quicker will be preferable.

It is to be noted that in a case of the step 102 of FIG. 8, the above described perturbation method may be modified such that not only Ta but also Tb are made variable simultaneously and the perturbation is applied to both of these alternatively.

Thus, according to this first embodiment, it is possible to provide a quadrature amplitude modulator with distortion compensation capable of avoiding the deterioration of the modulated wave due to the linear distortions completely and accurately by a simple configuration.

Figures 11A, 11B, 11C:
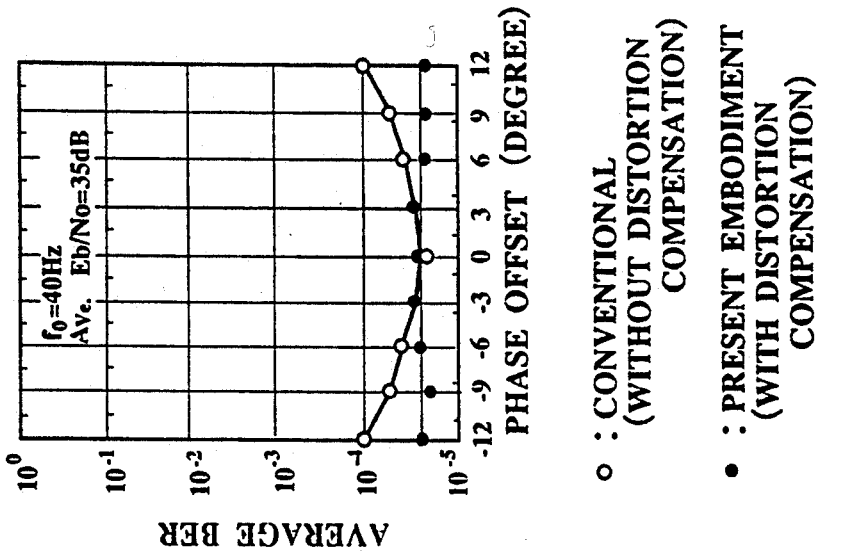
FIGS. 11A, 11B, and 11C are graphs of the average bit error rates of an equalizer using the quadrature amplitude modulator of FIG. 6 and of an equalizer using a conventional modulator without distortion compensation, with respect to the DC off-set, the amplitude balance, and the phase off-set, respectively.

The effect of this first embodiment is demonstrated in the graphs of the experiment results shown in FIGS. 11A, 11B, and 11C, in which the average bit error rate (BER) in an output of an equalizer using the quadrature amplitude modulator of this first embodiment is plotted with respect to the relative DC off-set, in-phase and quadrature amplitude ratio (I/Q ratio), and phase off-set, respectively, along with the comparative experiment results for an equalizer using a conventional quadrature amplitude modulator without distortion compensation. It is apparent that by using the quadrature amplitude modulator of this first embodiment, a significant reduction of the average bit error rate in an output of an equalizer becomes possible, which reflects the complete and accurate distortion compensation in this first embodiment.

It is also to be noted that in a case the quadrature amplitude modulator of this first embodiment is used in a transmission system performing the burst transmission, the compensation of the distortions can be carried out in real time by carrying out the determination of the linear transformation parameters during the periods in which the actual transmission is interrupted, such that the accuracy of the quadrature amplitude modulation can be maintained regardless of the device temperature variation and the variation of operational characteristics due to aging.

Figure 12:
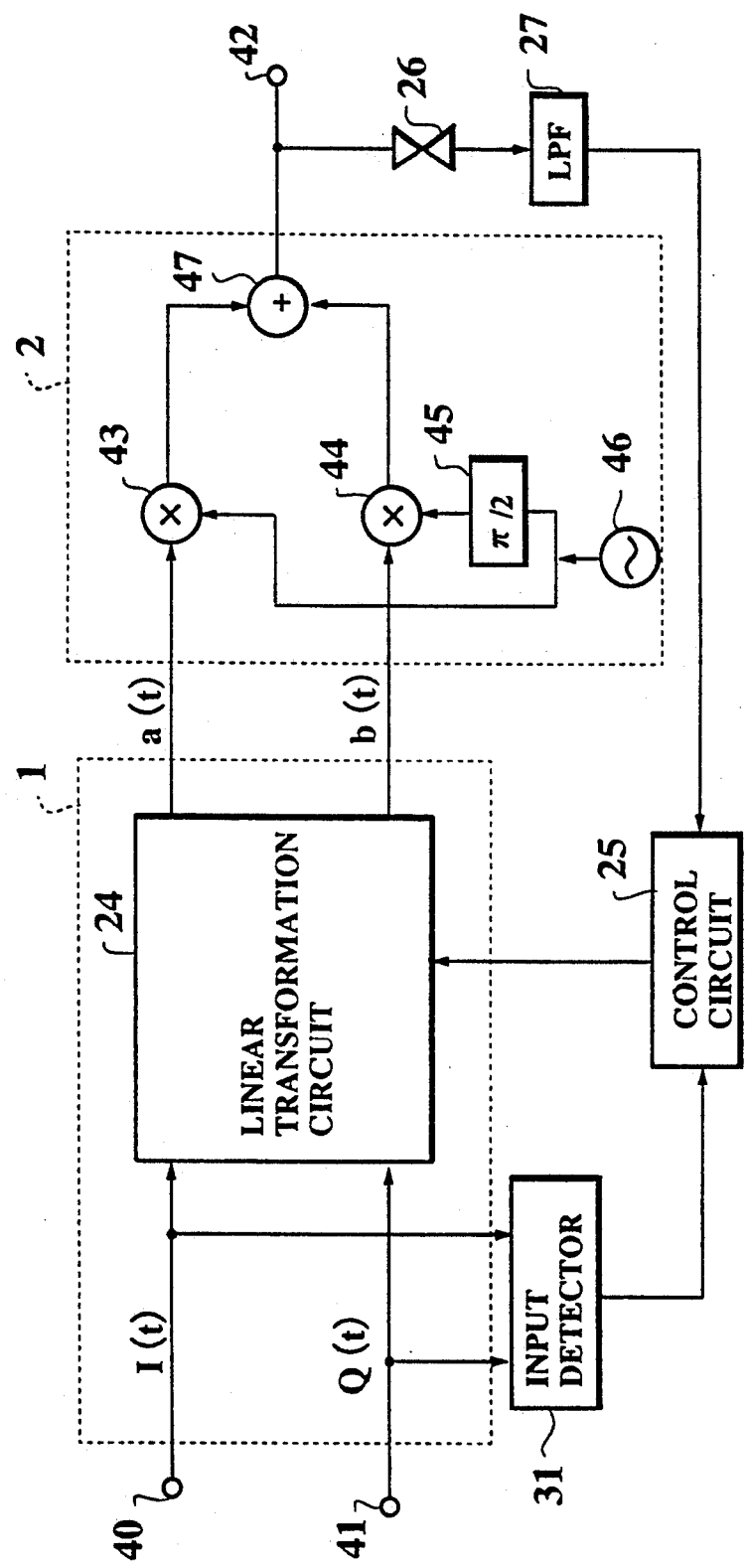
FIG. 12 is a detail block diagram of the second embodiment of a quadrature amplitude modulator with distortion compensation according to the present invention.

Referring now to FIG. 12, the second embodiment of the quadrature amplitude modulator with distortion compensation according to the present invention will be described in detail. Here, those elements which are substantially equivalent to the corresponding elements in the first embodiment described above will be given the same reference numerals in FIG. 12, and their descriptions will be omitted.

This second embodiment of FIG. 12 differs from the first embodiment described above in that instead of supplying test baseband and input signals from the control circuit 25 through the switches 20, 21, 22, and 23, the entering in-phase and quadrature amplitude input signals I(t) and Q(t) are detected by an input detector 31, from which the values of the in-phase and quadrature amplitude input signals I(t) and Q(t) entering into the linear transformation circuit 24 are reported to the control circuit 25, such that the control circuit 25 can carry out the determination of the appropriate linear transformation parameters similar to that described above for the first embodiment by using the entering in-phase and quadrature amplitude input signals I(t) and Q(t) monitored by the input detector 31 as the test input signals and monitoring the corresponding level signal z(t) obtained by the detector 26 and the low pass filter 27. In this manner, it becomes possible in this second embodiment of FIG. 12 to carry out the determination of the appropriate values of the linear transformation parameters in real time, without interrupting the regular modulation operation.

More specifically, in this second embodiment, the determination of the appropriate values of the linear transformation parameters is carried out as follows.

First, as for the DC off-set parameters a and b, the control circuit 25 controls the linear transformation circuit 24 such that a periodic perturbation signal with a small perturbation amplitude is superposed onto the linear transformation parameter a. Then, by using the same perturbation signal, the control circuit 25 carries out the correlation detection of the resulting level signal z(t) from the detector 26 and the low pass filter 27 with respect to the perturbation signal, and adjusts the linear transformation parameter a such that the correlation detection level becomes zero, to determine the appropriate value $a_0$. Similarly, the linear transformation parameter b is adjusted by superposing the perturbation signal at the linear transformation circuit 24 and obtaining the correlation detection of the resulting level signal z(t) with respect to the perturbation signal such that the correlation detection level becomes zero, to obtain the appropriate value $b_0$.

Next, in order to determine the linear transformation parameter $\alpha$, the control circuit 25 sets the determined appropriate values $a_0$ and $b_0$ for the linear transformation parameters a and b to the linear transformation circuit 24 along with provisional settings of the linear transformation parameters $\theta_0=0$ and $\alpha_0=1$. Then, the control circuit 25 measures the value $I_1$ of the in-phase amplitude input signal I(t) and the value $z_3$ of the corresponding level signal z(t) at a moment at which the quadrature amplitude input signal Q(t) becomes zero, as well as the value $Q_2$ of the quadrature amplitude input signal Q(t) and the value $z_4$ of the corresponding level signal z(t) at a moment at which the in-phase amplitude input signal I(t) becomes zero. Then, the control circuit 25 calculates the appropriate value $\alpha_0$ of the linear transformation parameter $\alpha$ according to the following equation.

$$\alpha_0 = (I_1/Q_2)(z_4/z_3)^{\frac{1}{2}} \tag{30}$$

Next, in order to determine the linear transformation parameter $\theta$, the control circuit 25 sets the determined appropriate values $a_0$, $b_0$, and $\alpha_0$ for the linear transformation parameters a, b, and $\theta$ to the linear transformation circuit 24 along with provisional settings of the linear transformation parameters $\theta_0=0$. Then, the control circuit 25 measures the value $z_5$ of the level signal z(t) at a moment at which the in-phase and quadrature amplitude input signals I(t) and Q(t) becomes equal to each other at the same value $A_1$, i.e., when $I(t)=Q(t)=A_1$, as well as the value $z_6$ of the level signal z(t) at a moment at which the in-phase and quadrature amplitude input signals I(t) and Q(t) becomes negative of each other at the same value $A_2$, i.e., $I(t) = -Q(t) = A_2$. Then, the control circuit 25 calculates the appropriate value $\theta_0$ of the linear transformation parameter $\theta$ according to the following equations.

$$\theta_0 = \arcsin[(1-\beta)/(1+\beta)] \qquad (31)$$

where $$\beta = z_5 A_2^2 / z_6 A_1^2 \qquad (32)$$

Thus, in this second embodiment, the linear transformation parameters for the DC off-set can be determined by simply adding the perturbation signal and taking the correlation detection of the resulting level signal with respect to the perturbation signal, while the linear transformation parameters for the amplitude balance and the orthogonal phase relationship can be determined by detecting the prescribed input states in which the in-phase and quadrature amplitude input signals $I(t)$ and $Q(t)$ satisfy the prescribed condition as described in detail above.

It is to be noted that in this second embodiment, the correlation detection of the level signal with respect to the perturbation signal can be realized by using the perturbation method described above in conjunction with FIG. 9.

In practice, there are several choices for the actual implementation of circuit configurations of the various elements in the first and second embodiments described above.

As already mentioned above, the control circuit 25 is preferably be realized in a form of a digital circuit because of the nature of the processing operation to be carried out in the control circuit 25, and in such a case the output of the lower pass filter 27 should preferably be A/D converted.

As for the linear transformation unit 1, it can be realized in a form of either a digital circuit or an analog circuit.

Figure 13:
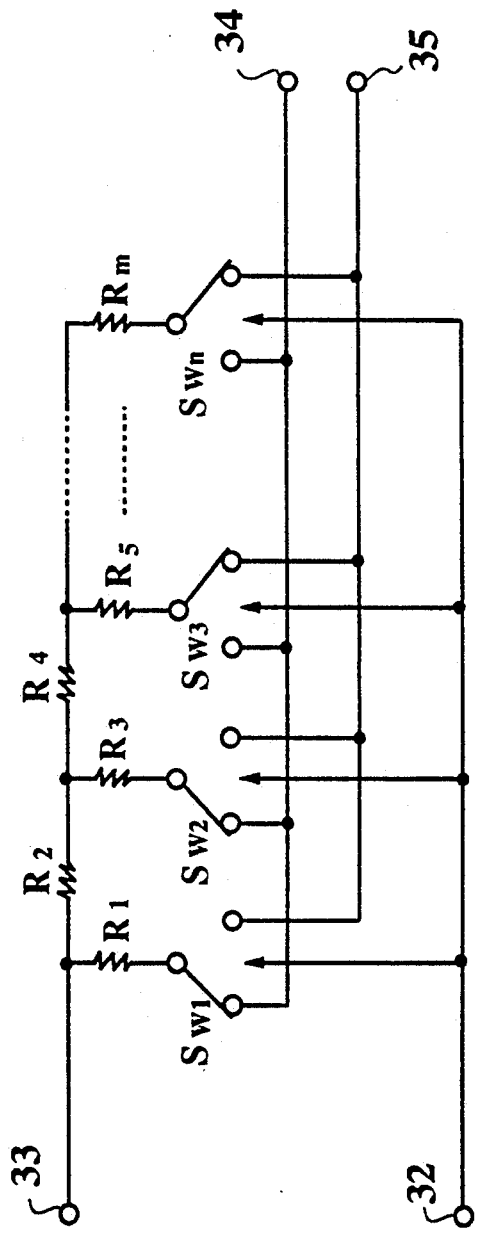
FIG. 13 is a circuit diagram of a four quadrant D/A converter to be utilized in the linear transformation unit of the quadrature amplitude modulator of FIG. 6.

In order to realize the linear transformation unit 1 in a form of an analog circuit, multipliers of high precision are required. Here, since the linear transformation parameters specified by the control circuit 25 are given in a form of digital signal, each multiplier should preferably be formed by a four quadrant D/A converter formed from a plurality of resistors and switches as shown in FIG. 13. In the four quadrant D/A converter of FIG. 13, the multiplying value given by a digital signal is entered from the control circuit 25 into a digital input terminal 32 while the value to be multiplied is entered into a reference input terminal 33. The multiplying value entered into the digital input terminal 51 then controls the switches SW1 to SWn such that an analog multiplication output with high precision can be obtained at output terminals 34 and 35. The analog multiplication output outputted at the output terminals 34 and 35 is given in a form of two mutually complementary current signals including a regular one $a(t)$ and an inverted one $\bar{a}(t)$, where the inverted one $\bar{a}(t)$ is obtained by inverting a polarity of the regular one $a(t)$ so that they are symmetrically given with respect to a balanced level such as an analog ground level. Such an analog multiplication output is then outputted to the quadrature modulation unit 2 through an amplifier.

Figure 14:
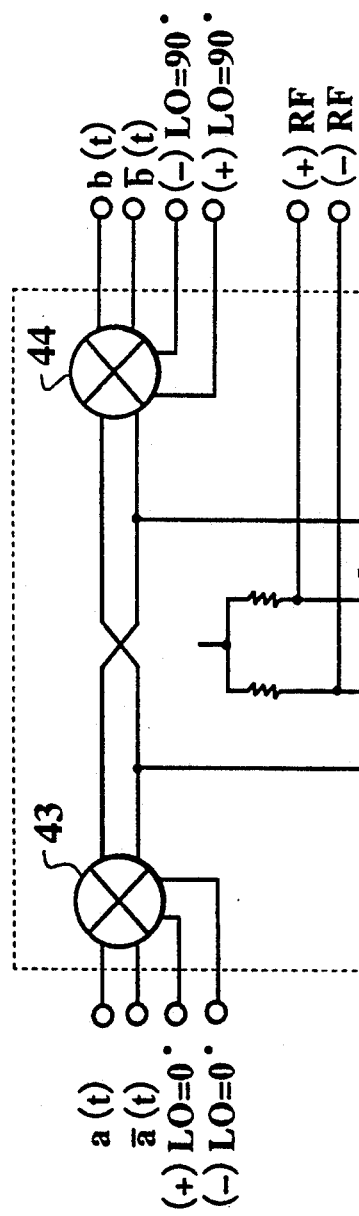
FIG. 14 is a circuit diagram of a modulator part of the quadrature modulation unit of the quadrature amplitude modulator of FIGS. 6 and 12.
Figure 15:
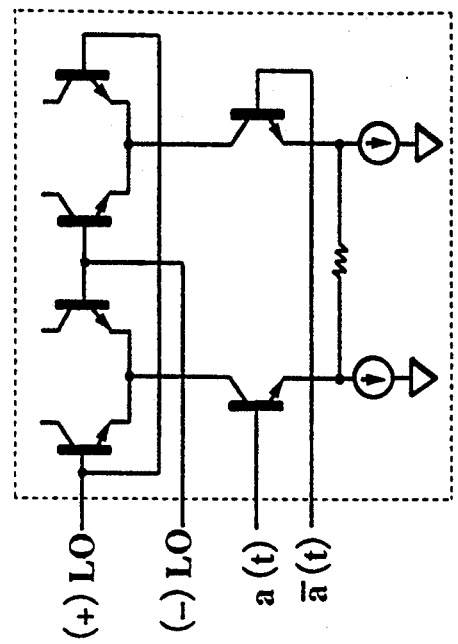
FIG. 15 is a circuit diagram of a differential amplifier configuration used for mixers in the modulator

A modulator part of the quadrature modulation unit 2 can be realized by a configuration shown in FIG. 14, in which each of the mixers 43 and 44 is a double balanced mixer having a differential amplifier configuration shown in FIG. 15, for which two mutually complementary inputs $a(t)$, $\bar{a}(t)$ and $b(t)$, $\bar{b}(t)$ are necessary. Such two complementary inputs may be obtained by using an inversion amplifier on the analog baseband signals outputted from the linear transformation circuit 24.

In a case of realizing the linear transformation unit 1 in a form of a digital circuit, the in-phase and quadrature amplitude signals entering into the linear transformation unit 1 should be A/D converted, and the digital baseband output signals of the linear transformation unit 1 should be D/A converted before entering into the quadrature modulation unit 2.

It is also to be noted that in the embodiments described above, the linear transformation parameters obtained by the control circuit 25 should preferably be stored in a non-volatile memory such that the previously calculated parameters would not be lost when the power is turned off and can be resumed when the power is newly turned on.

It is also to be noted that, in a practical implementation of the quadrature amplitude modulator according to the present invention, the linear transformation unit 1 and the parameter generation unit 4 are most conveniently manufactured integrally on a single IC of CMOS type, while the quadrature modulation unit 2 and the level signal generation unit 3 are most conveniently manufactured integrally on a single IC of bipolar or GaAs type, such that the quadrature amplitude modulator is realized by a combination of these two ICs.

It is further to be noted that besides those already mentioned above, many modifications and variations of the above embodiments may be made without departing from the novel and advantageous features of the present invention. Accordingly, all such modifications and variations are intended to be included within the scope of the appended claims.

What is claimed is:

1. A quadrature amplitude modulator, comprising:

linear transformation means for applying a linear transformation on in-phase and quadrature amplitude input signals $I(t)$ and $Q(t)$ to obtain in-phase and quadrature amplitude baseband signals $a(t)$ and $b(t)$;

quadrature modulation means for obtaining a modulated wave from the in-phase and quadrature amplitude baseband signals $a(t)$ and $b(t)$ obtained by the linear transformation means;

level signal generation means for generating level signal $z(t)$ corresponding to the in-phase and quadrature amplitude input signals $I(t)$ and $Q(t)$ by removing carrier components from the modulated wave obtained by the quadrature modulation means; and parameter generation means for determining appropriate values of linear transformation parameters of the linear transformation applied by the linear transformation means according to the level signal $z(t)$ generated by the level signal generation means.

2. The quadrature amplitude modulator of claim 1, wherein the linear transformation applies the linear transformation defined by:

$$a(t) = I(t) + \tan\theta \cdot Q(t) + a$$

and $$b(t) = (1/a\cos\theta)Q(t) + b$$

where a, b, α, and θ are the linear transformation parameters determined by the parameter generation means.

3. The quadrature amplitude modulator of claim 2, wherein the parameter generation means determines the linear transformation parameters a and b as appropriate values $a_0$ and $b_0$ of the in-phase and quadrature amplitude baseband signals a(t) and b(t) which minimize the resulting level signal obtained by the level signal generation means.

4. The quadrature amplitude modulator of claim 3, further comprises baseband signal switch means for selectively connecting the parameter generation means to input side of the quadrature modulation means, and wherein the parameter generation means supplies variable test baseband signals in places of the in-phase and quadrature amplitude baseband signals in order to find the appropriate values $a_0$ and $b_0$ of the in-phase and quadrature amplitude baseband signals a(t) and b(t) which minimize the resulting level signal obtained by the level signal generation means.

5. The quadrature amplitude modulator of claim 3, wherein the appropriate values $a_0$ and $b_0$ of the in-phase and quadrature amplitude baseband signals a(t) and b(t) which minimize the resulting level signal obtained by the level signal generation means are found by using a perturbation method.

6. The quadrature amplitude modulator of claim 3, wherein the parameter generation means determines the linear transformation parameter α by setting the determined appropriate values $a_0$ and $b_0$ for the linear transformation parameters a and b, setting provisional values $\theta=0$ and $\alpha=1$ for the linear transformation parameters θ and α, measuring a value $z_1$ of the level signal z(t) for the in-phase amplitude input signal I(t)=a predetermined value A and the quadrature amplitude input signal Q(t)=0, measuring a value $z_2$ of the level signal z(t) for the in-phase amplitude input signal I(t)=0 and the quadrature amplitude input signal Q(t)=the predetermined value A, and calculating an appropriate value $\alpha_0$ of the linear transformation parameter α by:

$$\alpha_0=(z_2/z_1)^{\frac{1}{2}}$$

7. The quadrature amplitude modulator of claim 6, further comprises input signal switch means for selectively connecting the parameter generation means to input side of the linear transformation means, and wherein the parameter generation means supplies variable test input signals in places of the in-phase and quadrature amplitude input signals in order to measure the values $z_1$ and $z_2$.

8. The quadrature amplitude modulator of claim 6, wherein the parameter generation means determines the linear transformation parameter θ by setting the determined appropriate values $a_0$, $b_0$, and $\alpha_0$ for the linear transformation parameters a, b, and α, setting provisional values $\theta=0$ for the linear transformation parameters θ, determining a value $I_0$ of the in-phase amplitude input signal I(t) which minimizes the resulting level signal obtained by the level signal generation means with the quadrature amplitude input signal Q(t)=the predetermined value A, and calculating an appropriate value $\theta_0$ of the linear transformation parameter θ by:

$$\theta_0=\arcsin(I_0/\alpha_0 A)$$

9. The quadrature amplitude modulator of claim 8, further comprises input signal switch means for selectively connecting the parameter generation means to input side of the linear transformation means, and wherein the parameter generation means supplies variable test input signals in places of the in-phase and quadrature amplitude input signals in order to find the value $I_0$ of the in-phase amplitude input signals I(t) which minimize the resulting level signal obtained by the level signal generation means.

10. The quadrature amplitude modulator of claim 8, wherein the value $I_0$ of the in-phase amplitude input signal I(t) which minimizes the resulting level signal obtained by the level signal generation means is found by using a perturbation method.

11. The quadrature amplitude modulator of claim 2, wherein the parameter generation means determines appropriate values $a_0$ and $b_0$ of the linear transformation parameters a and b by superposing a periodic perturbation signal of a small perturbation amplitude on the linear transformation parameters a and b in order to adjust the linear transformation parameters a and b such that correlation detection levels of the resulting level signals obtained by the level signal generation means with respect to the perturbation signal become zero.

12. The quadrature amplitude modulator of claim 11, wherein the parameter generation means determines the linear transformation parameter α by setting the determined values $a_0$ and $b_0$ for the linear transformation parameters a and b, setting provisional values $\theta=0$ and $\alpha=1$ for the linear transformation parameters θ and α, measuring a value $I_1$ of the in-phase amplitude input signal I(t) and a value $z_3$ of the level signal z(t) at a moment at which the quadrature amplitude input signal Q(t) becomes zero, measuring a value $Q_2$ of the quadrature amplitude input signal Q(t) and a value $z_4$ of the level signal z(t) at a moment at which the in-phase amplitude input signal I(t) becomes zero, and calculating an appropriate value $\alpha_0$ of the linear transformation parameter α by:

$$\alpha_0=(I_1/Q_2)\cdot(z_4/z_3)^{\frac{1}{2}}$$

13. The quadrature amplitude modulator of claim 12, wherein the parameter generation means determines the linear transformation parameter θ by setting the determined appropriate values $a_0$, $b_0$, and $\alpha_0$ for the linear transformation parameters a, b, and α, setting provisional values $\theta=0$ for the linear transformation parameters θ, measuring a value $z_5$ of the level signal z(t) at a moment at which the in-phase and quadrature amplitude input signals I(t) and Q(t) becomes equal to each other at a value $A_1$ (I(t)=Q(t)=$A_1$), measuring a value $z_6$ of the level signal z(t) at a moment at which the in-phase and quadrature amplitude input signals I(t) and Q(t) becomes negative of each other at a value $A_2$ (I(t)=−Q(t)=$A_2$), and calculating an appropriate value $\theta_0$ of the linear transformation parameter θ by:

$$\theta_0=\arcsin[(1-\beta)/(1+\beta)]$$

where $$\beta=z_5 A_2^2/z_6 A_1^2$$

14. The quadrature amplitude modulator of claim 2, wherein the parameter generation means sequentially determines the linear transformation parameters in such an order that the linear transformation parameters a and b for a DC off-set are determined first, then the linear transformation parameter $\alpha$ for an amplitude balance is determined next while compensating distortion parameter $\theta$ for an then the linear transformation parameter $\theta$ for an orthogonal phase relationship is determined while compensating distortions due to the DC off-set and the amplitude balance.

15. The quadrature amplitude modulator of claim 1, wherein the linear transformation means includes a four quadrant D/A converter means having a reference input terminal for receiving a signal to be multiplied and a digital input terminal for receiving a signal for multiplying, for carrying out a multiplication of the signal to be multiplied and the signal for multiplying.

16. The quadrature amplitude modulator of claim 1, wherein the quadrature modulation means includes means for inverting polarities of the baseband signals outputted from the linear transformation means with respect to a balance level to obtain inverted baseband signals, and a double balanced mixer for which the baseband signals outputted from the linear transformation means and the inverted baseband signals obtained by said means for inverting are entered as inputs.

17. The quadrature amplitude modulator of claim 1, wherein the level signal generation means comprises detector means for detecting the modulated wave outputted from the quadrature modulation means, and a low pass filter means for removing carrier components from the modulated wave detected by the detector means so as to obtain the level signal.

18. The quadrature amplitude modulator of claim 17, wherein the detector means includes a double balanced mixer having an RF terminal and LO terminal to receive the modulated wave and a baseband terminal for outputting the detected modulated wave.

19. The quadrature amplitude modulator of claim 1, further comprising an A/D converter means for A/D converting the in-phase and quadrature amplitude input signals entering into the linear transformation means, and a D/A converter means for D/A converting the in-phase and quadrature amplitude baseband signals outputted from the linear transformation means.

20. The quadrature amplitude modulator of claim 1, further comprising an A/D converter means for A/D converting the level signal outputted from the level signal generation means.

21. The quadrature amplitude modulator of claim 1, further comprising a non-volatile memory for memorizing the linear transformation parameters determined by the parameter generation means, wherein the linear transformation parameters memorized in the non-volatile memory are initially used by the linear transformation means every time the quadrature amplitude modulator is re-activated.

22. The quadrature amplitude modulator of claim 1, wherein the level signal generation means is calibrated such that the level signal corresponding to a zero level modulated wave becomes zero.

23. The quadrature amplitude modulator of claim 1, further comprising input detector means for detecting the in-phase and quadrature amplitude input signals entering into the linear transformation means.

24. The quadrature amplitude modulator of claim 1, wherein the linear transformation means and the parameter generation means are implemented on a single IC.

25. The quadrature amplitude modulator of claim 1, wherein the quadrature modulation means and the level signal generation means are implemented on a signal IC.

26. A quadrature amplitude modulator, comprising:
    linear transformation means for applying a linear transformation on in-phase and quadrature amplitude input signals to obtain in-phase and quadrature amplitude baseband signals;
    quadrature modulation means for obtaining a modulated wave from the in-phase and quadrature amplitude baseband signals obtained by the linear transformation means; and
    parameter generation means for determining appropriate values of linear transformation parameters of the linear transformation applied by the linear transformation means sequentially in such an order that the linear transformation parameters for a DC off-set are determined first, then the linear transformation parameter for an amplitude balance is determined next while compensating distortion due to the DC off-set, and then the linear transformation parameter for an orthogonal phase relationship is determined while compensating distortions due to the DC off-set and the amplitude balance.

* * * * *